(12) United States Patent
Fujita

(10) Patent No.: US 12,522,054 B2
(45) Date of Patent: Jan. 13, 2026

(54) VEHICLE AIR CONDITIONING APPARATUS

(71) Applicant: SANDEN CORPORATION, Isesaki (JP)

(72) Inventor: Taichi Fujita, Isesaki (JP)

(73) Assignee: SANDEN CORPORATION, Isesaki (JP)

( * ) Notice: Subject to any disclaimer, the term of this patent is extended or adjusted under 35 U.S.C. 154(b) by 28 days.

(21) Appl. No.: 18/043,666

(22) PCT Filed: Sep. 17, 2021

(86) PCT No.: PCT/JP2021/034262
§ 371 (c)(1),
(2) Date: Mar. 1, 2023

(87) PCT Pub. No.: WO2022/059770
PCT Pub. Date: Mar. 24, 2022

(65) Prior Publication Data
US 2023/0278400 A1    Sep. 7, 2023

(30) Foreign Application Priority Data

Sep. 18, 2020 (JP) ................................. 2020-157477

(51) Int. Cl.
*B60H 1/32* (2006.01)
(52) U.S. Cl.
CPC .................................. *B60H 1/3233* (2013.01)
(58) Field of Classification Search
CPC .................................. B60H 1/3233; F24F 1/42
See application file for complete search history.

(56) References Cited

U.S. PATENT DOCUMENTS

| | | | | | |
|---|---|---|---|---|---|
| 4,687,604 | A | * | 8/1987 | Goettl | F24F 6/04 62/304 |
| 4,783,971 | A | * | 11/1988 | Alba | F25D 21/14 312/334.44 |
| 2005/0109055 | A1 | * | 5/2005 | Goetzinger | F24F 13/222 62/291 |

(Continued)

FOREIGN PATENT DOCUMENTS

| | | |
|---|---|---|
| DE | 60 2004 001 248 T2 | 5/2007 |
| EP | 1 457 366 A1 | 9/2004 |
| JP | 2000-198348 A | 7/2000 |

(Continued)

OTHER PUBLICATIONS

JP-2004276707-A Translation (Year: 2004).*

(Continued)

*Primary Examiner* — David J Teitelbaum
(74) *Attorney, Agent, or Firm* — Baker Botts L.L.P.

(57) ABSTRACT

A vehicle air conditioning apparatus includes an air conditioning unit including an air flow path along a floor of a vehicle. The air conditioning unit includes a drain pan provided in a bottom of the air conditioning unit, and drainage channels provided around the drain pan. The drain pan includes an inclined surface formed on its inner wall surface and configured to incline downward from a top portion having an upward convex shape to the drainage channels. Each of the drainage channels includes a flow path configured to allow water to flow to a drain outlet provided in a drainage channel.

3 Claims, 6 Drawing Sheets

(56) References Cited

U.S. PATENT DOCUMENTS

2009/0249812 A1* 10/2009 Timbs .................. F24F 13/222
62/56
2011/0005720 A1 1/2011 Seto

FOREIGN PATENT DOCUMENTS

| JP | 2004276707 A | * 10/2004 | ......... B60H 1/00028 |
| JP | 2016-078797 A | 5/2016 | |
| KR | 10-2004-0072068 A | 8/2004 | |

OTHER PUBLICATIONS

International Search Report mailed Nov. 9, 2021 for International Application No. PCT/JP2021/034262.
Japan Patent Office, Notice of Reasons for Refusal issued in Japanese Patent Application No. 2020-157477, dated Jan. 29, 2024 (6 pages).
Japan Patent Office, Written Opinion of the International Searching Authority issued in International Patent Application No. PCT/JP2021/034262, mailed Nov. 9, 2021.
Japan Patent Office, Notice of Reasons for Refusal issued in Japanese Patent Application No. 2020-157477, dated Jun. 20, 2024.
German Patent and Trade Mark Office, Office Action issued in German Patent Application No. 11 2021 003 546.0, dated May 6, 2024 (11 pages).

* cited by examiner

VEHICLE AIR CONDITIONING APPARATUS

TECHNICAL FIELD

The present invention relates to a vehicle air conditioning apparatus.

BACKGROUND ART

There has been known a vehicle air conditioning apparatus including an air conditioning unit having an air passage extending in an approximately horizontal direction of a vehicle. In the air passage, a heat absorbing heat exchanger (evaporator) and a heat releasing heat exchanger (heater core) are arranged in series in the air flow direction. The heat absorbing heat exchanger is inclined at an angle of 5 to 30 degrees with respect to the extending direction of the air passage, and the heat releasing heat exchanger is inclined in the same direction (see, Patent Literature 1 mentioned below).

CITATION LIST

Patent Literature

PTL1: Japanese Patent Application Laid-Open No. 2004-276707

SUMMARY OF INVENTION

Problem to be Solved by the Invention

In the conventional vehicle air conditioning apparatus, when the inclination of the heat absorbing heat exchanger is too increased (the inclination angle is too large), the effect of thinning the air conditioning unit is reduced, and, on the other hand, when the inclination of the heat absorbing heat exchanger is too decreased (the inclination angle is too small), the drainage of water of condensation becomes poor, and the air-flow resistance of the air passage is too increased.

Therefore, the inclination of the heat absorbing heat exchanger is set to an appropriate range, and the water of condensation generated in the heat absorbing heat exchanger flows down along the inclination of the heat absorbing heat exchanger, passes through drainage guide channels provided under the heat absorbing heat exchanger in the air conditioning unit, and is discharged from drain outlets. In this case, the drainage guide channels are provided on the inner wall surface on both sides of the air passage in the width direction and extend along the longitudinal direction of the air passage. A drain pan whose center is elevated to project in the air passage is provided on the inner wall surface between the drainage guide channels.

In this vehicle air conditioning apparatus, when the inclination of the vehicle body is large, the inclination of the heat absorbing heat exchanger to drain the water of condensation is not sufficient in some cases. Also, it is not possible to secure sufficient inclinations of the drain pan and the drainage guide channels to form a drainage flow path to the drain outlets.

In particular, when the vehicle is a construction machine, it is assumed that the vehicle is inclined at a large angle with respect to the horizontal plane during the work. In the construction machine industry, machines are designed by assuming that the maximum inclination to the right, the left, the front and the back with respect to the horizontal plane is 30 degrees, and the vehicle air conditioning apparatus installed in the construction machine is required to provide the drainage having no problem with the inclination of the vehicle.

The present invention has been achieved in consideration of the circumstances, and it is therefore an object of the invention to secure the drainage in the vehicle air conditioning apparatus even when the vehicle is inclined to the right, the left, the front, or the back.

Solution to Problem

To solve the above-described problem, the invention provides a vehicle air conditioning apparatus including an air conditioning unit including an air flow path along a floor of a vehicle. The air conditioning unit includes a drain pan provided in a bottom of the air conditioning unit, and drainage channels provided around the drain pan. The drain pan includes an inclined surface formed on its inner wall surface and configured to incline downward from a top portion having an upward convex shape to the drainage channels. Each of the drainage channels includes a flow path configured to allow water to flow to a drain outlet provided in a drainage channel.

Effect of the Invention

According to the invention, even when the vehicle is inclined to the right, the left, the front, or the back, the water (water of condensation) having dropped to the drain pan flows to the drain channels around the drain pan, passes through the flow passages of the drain channels, and finally flows to the drain outlets. Therefore, it is possible to secure good drainage.

DESCRIPTION OF EMBODIMENTS

Hereinafter, an embodiment of the invention will be described with reference to the drawings. In the description below, the same reference number in different drawings denotes the same component with the same function, and duplicate description for each of the drawings is omitted accordingly. In addition, in each of the drawings, direction of arrow Z denotes the thickness direction of the vehicle air conditioning apparatus, and direction of arrow X and direction of arrow Y denote directions orthogonal to one another and orthogonal to the Z direction.

Figure 1:
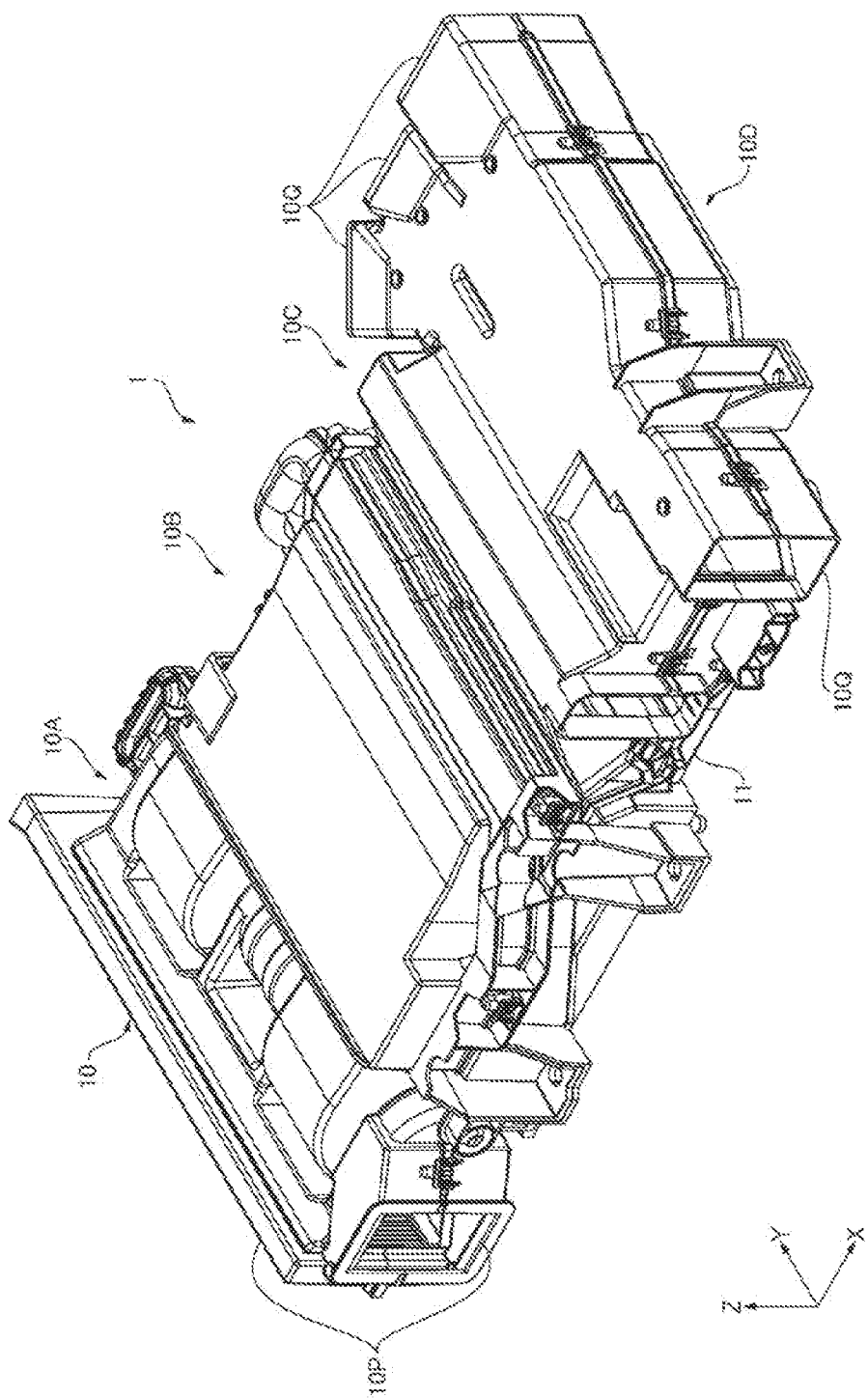
FIG. 1 illustrates a vehicle air conditioning apparatus according to an embodiment of the invention (perspective plan view)
Figure 2:
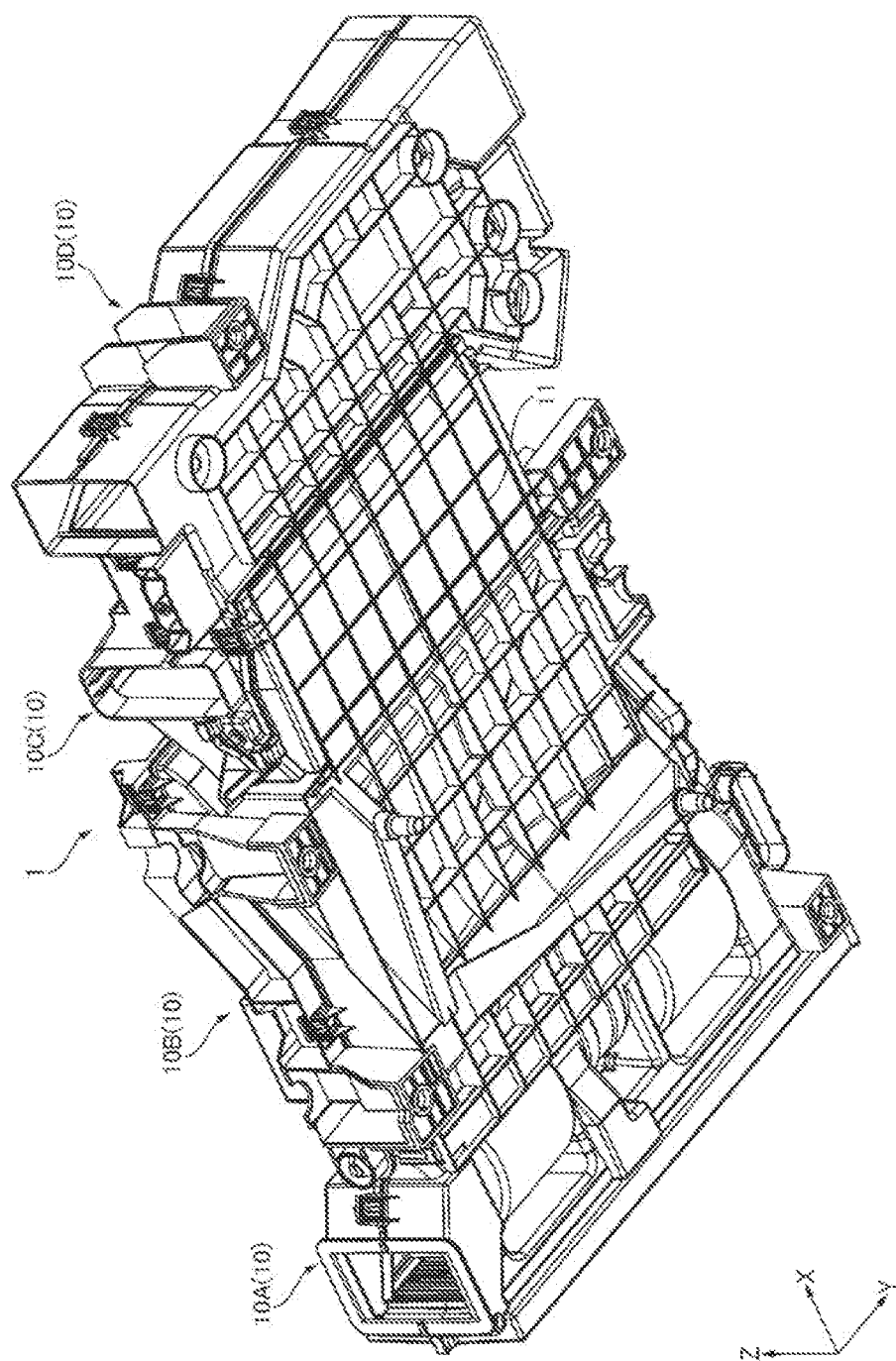
FIG. 2 illustrates the vehicle air conditioning apparatus according to an embodiment of the invention (perspective bottom view)
Figure 3:
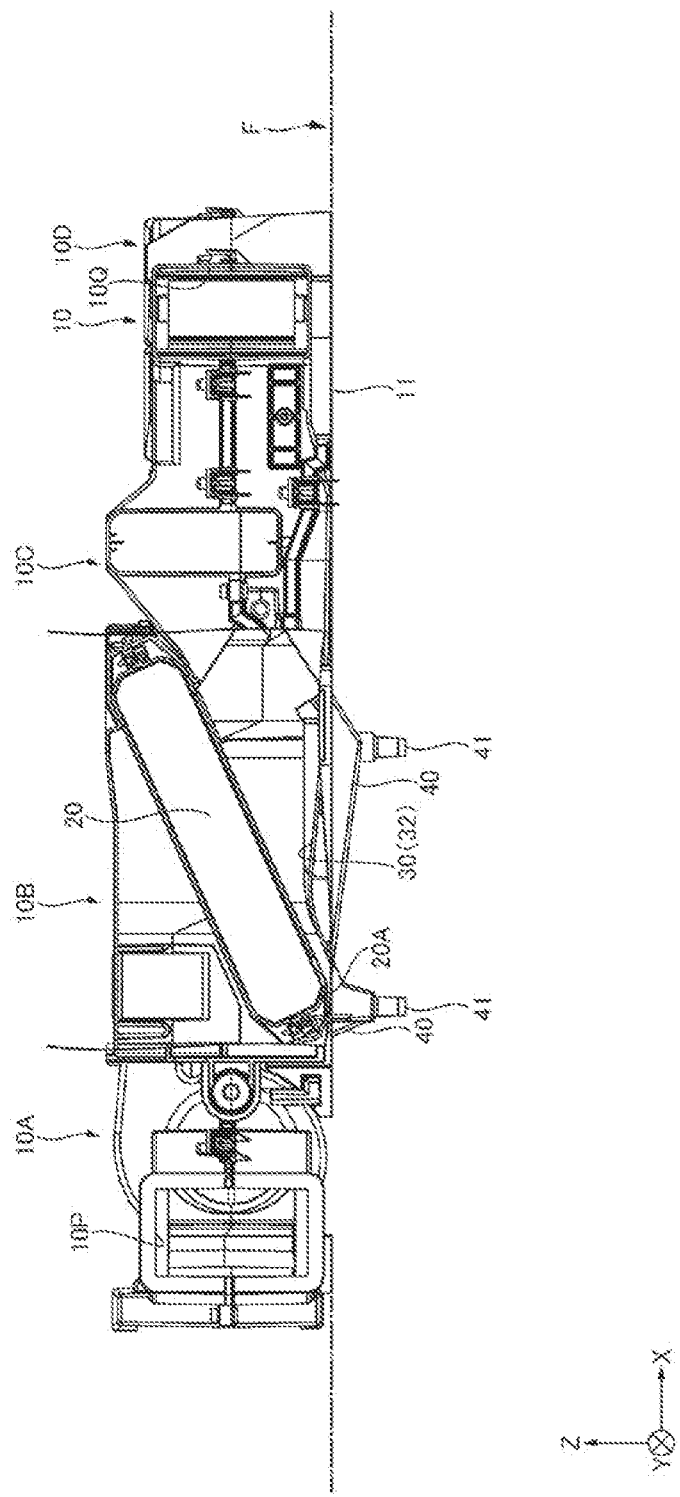
FIG. 3 illustrates the vehicle air conditioning apparatus according to an embodiment of the invention (side view)

As illustrated in FIG. 1 to FIG. 3, a vehicle air conditioning apparatus 1 includes an air conditioning unit 10 including an air flow path (not shown) along the floor of a vehicle. With the illustrated example, the air conditioning unit 10 includes a blower storage 10A, a heat absorbing heat exchanger storage 10B, a heat releasing heat exchanger storage 10C, and a blowing path forming section 10D. The air flow path extending from inlets 10P to outlets 10Q is formed in the air conditioning unit 10.

The air conditioning unit 10 includes a support surface 11 formed on its outer bottom surface, which is to be supported by a floor F (see FIG. 3) of the vehicle. The vehicle air conditioning apparatus 1 is installed in, for example, a construction machine vehicle. The air conditioning unit 10 is thinned to be provided in a space under a seat (not shown) and between the seat and the floor F along the X and Y directions, and the air flow path in the air conditioning unit 10 is formed along X-Y plane in the drawings.

As illustrated in FIG. 3, a heat absorbing heat exchanger (evaporator) 20 provided in the heat absorbing heat exchanger storage 10B of the air conditioning unit 10 is provided in the air flow path of the air conditioning unit 10 and inclined with respect to the air flow direction. With the illustrated example, the heat absorbing heat exchanger 20 is inclined to place a lower part 20A in the upwind side of the air flow path.

Figure 4:
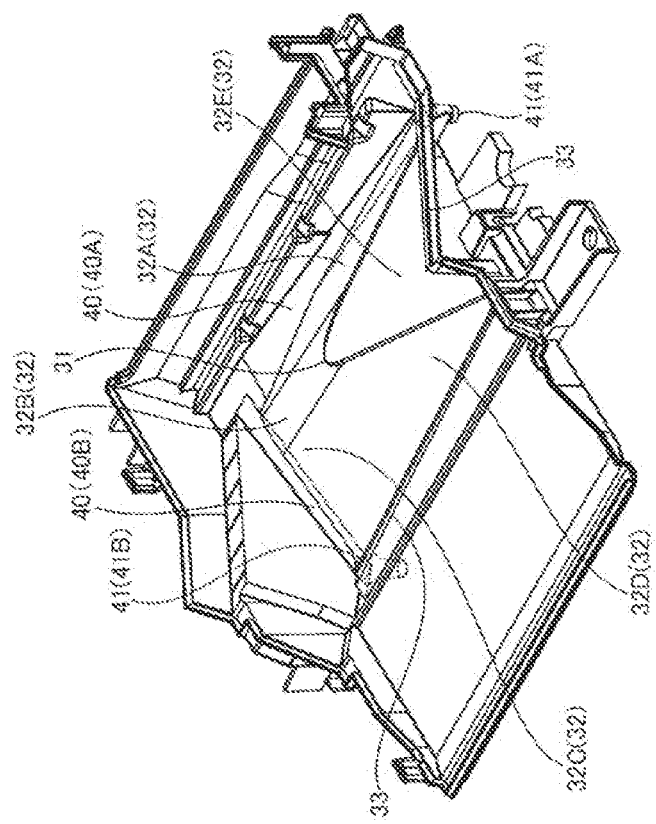
FIG. 4 illustrates a drain pan and drainage channels of the vehicle air conditioning apparatus (perspective view)
Figure 4:
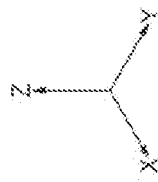
Figure 5:
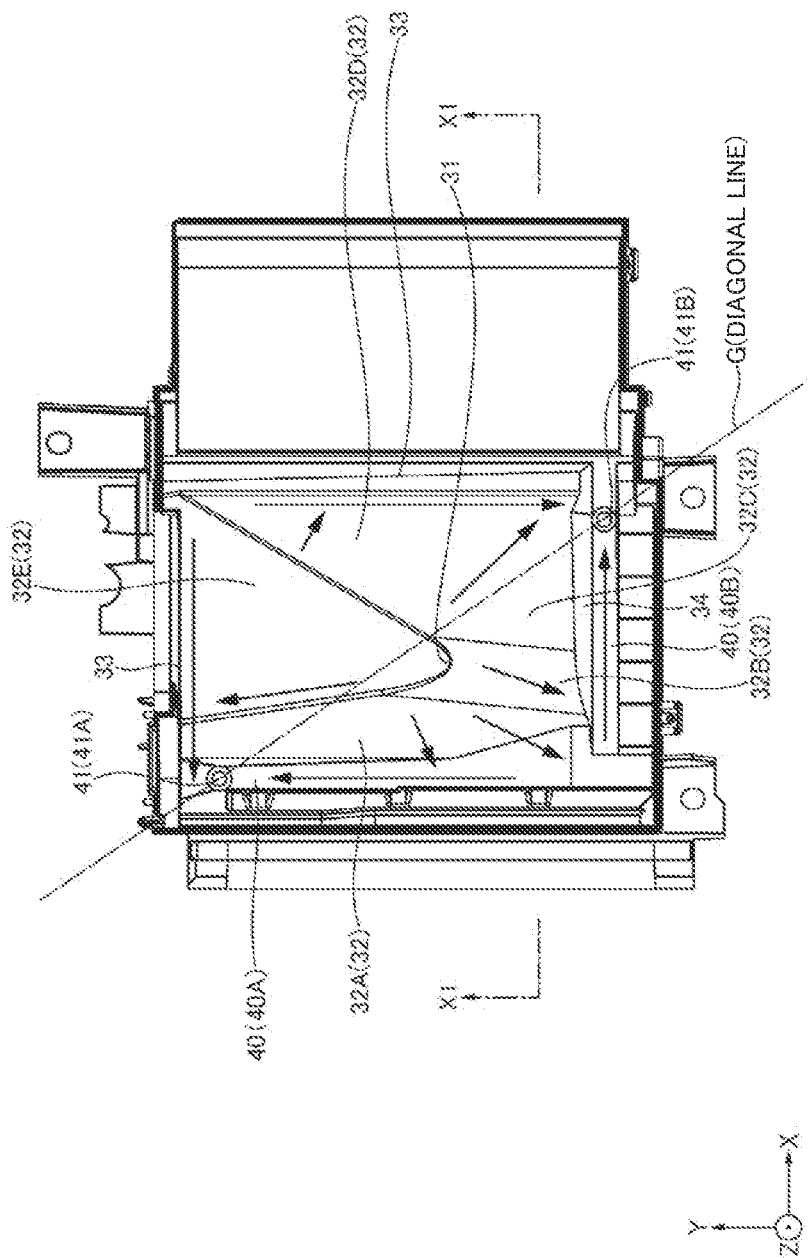
FIG. 5 illustrates the drain pan and the drainage channels of the vehicle air conditioning apparatus (plan view)

A drain pan 30 and drainage channels 40 are provided in the heat absorbing heat exchanger storage 10B of the air conditioning unit 10. As illustrated in FIG. 4 and FIG. 5, the drain pan 30 and the drainage channels 40 are formed as a one-piece part which can be partially attached to and detached from the air conditioning unit 10. The drain pan 30 is provided to face the lower surface of the heat absorbing heat exchanger 20 so as to receive the water of condensation generated in the heat absorbing heat exchanger 20, and the drainage channels 40 are provided around the drain pan 30.

The outer bottom of the drain pan 30 forms the support surface 11 on the floor F, and the drainage channels 40 protrude downward from the floor F (support surface 11). In this way, the drainage channels 40 protrude downward from the floor F, and therefore it is possible to increase the inclination of the drainage channels 40 without affecting the thickness of the air conditioning unit 10 on the floor. Therefore, it is possible to secure good drainage by increasing the inclination of the drainage channels 40 while forming a sufficient volume of the air flow path in the space between the floor F and the seat.

The drain pan 30 includes an inclined surface 32 provided in its inner wall surface on the air flow path side and configured to incline downward from a top portion 31 having an upward convex shape to the drainage channels 40. With the illustrated example, the inclined surface 32 is divided into a plurality of inclined surfaces 32A, 32B, 32C, 32D and 32E which become lower in level toward the arrow directions illustrated in FIG. 5.

With the illustrated example, the drainage channels 40 provided around the drain pan 30 are located around two sides of the outer edge of the inclined surface 32 which cross one another. The other sides of the outer edge of the inclined surface 32 are inclined downward toward the drainage channels 40, respectively. In addition, standing walls 33 to dam the water are provided outside the outer edge of the inclined surface 32 having no drainage channel 40.

Drain outlets 41 are provided in the drainage channels 40, respectively. Each of the drainage channels 40 is inclined to place the drain outlet 41 in the lowest position in the drain channel 40, and includes a flow path through which the water is flowed to the drainage outlet 41 when the water enters into the drainage channel 40. With the illustrated example, more than one (two) drain outlets 41 are provided in the drain pan 30 at diagonal positions in a plan view.

The drain pan 30 and the drainage channels 40 will be described in detail. The top portion 31 provided in the inner wall surface of the drain pan 30 is offset from the center of the drain pan 30 in a plan view, and the inclined surfaces 32A, 32B, 32C, 32D and 32E which are inclined downward from the top portion 31 have inclination angles different from each other.

To be more specific, the top portion 31 is offset to the drain channels 40 (40A, 40B) side with respect to a diagonal line G connecting between the two drain outlets 41 (41A, 41B) provided at diagonal positions of the drain pan 30 in a plan view, and the inclined surface 32A directly toward the drain channel 40 (40A) is the steepest. Then, the inclined surfaces 32B and 32C directly toward the drainage outlet 40 (40B) are steep secondly. On the other hand, the inclined surfaces 32D and 32E not directly toward the drainage channels 40 (40A, 40B) are relatively gentle. The outer edge of the inclined surface 32D is inclined downward to the drainage channel 40 (40B), and the outer edge of the inclined surface 32E is inclined downward to the drainage channel 40 (40A).

The drain pan 30 includes the inclined surface 32 as described above, and therefore, even when water drops anywhere on the inner wall surface of the drain pan 30, the water finally flows into the drainage channels 40 (40A, 40B), and consequently the water is not leaked to the outside of the drain pan 30.

To be more specific, the water having dropped to any of the inclined surfaces 32A, 32B, and 32C flows directly into the drainage channels 40 (40A, 40B). In this case, a cliff portion 34 as a steeper inclined surface is provided in a section from the inclined surfaces 32B and 32C to the drainage channel 40 (40B). By providing the cliff portion 34, it makes it easy to flow the water having dropped to the inclined surfaces 32B and 32C into the drainage channel 40 (40B).

The water having dropped to the inclined surface 32D flows to the outer edge of the inclined surface 32D once, and flows to the drainage channel 40 (40B) through the outer edge. The water having dropped to the inclined surface 32E flows to the outer edge of the inclined surface 32E once, and flows to the drainage channel 40 (40A) through the outer edge. The standing walls 33 to dam the water are provided outside the outer edges of the inclined surfaces 32D and 32E, and therefore flow paths to allow the water to flow to the drainage channels 40 (40A, 40B) are formed inside the standing walls 33.

In the drainage channels 40 (40A, 40B), the drain outlets 41 (41A, 41B) are provided in the lowest position, and flow paths inclined toward the drain outlets are formed. The inclination of the inside of the drainage channels 40 (40A, 40B) can be steeper without limitation due to the space above the floor F, because the drainage channels 40 (40A, 40B) protrude downward from the floor F. This secures good drainage.

Figure 6:
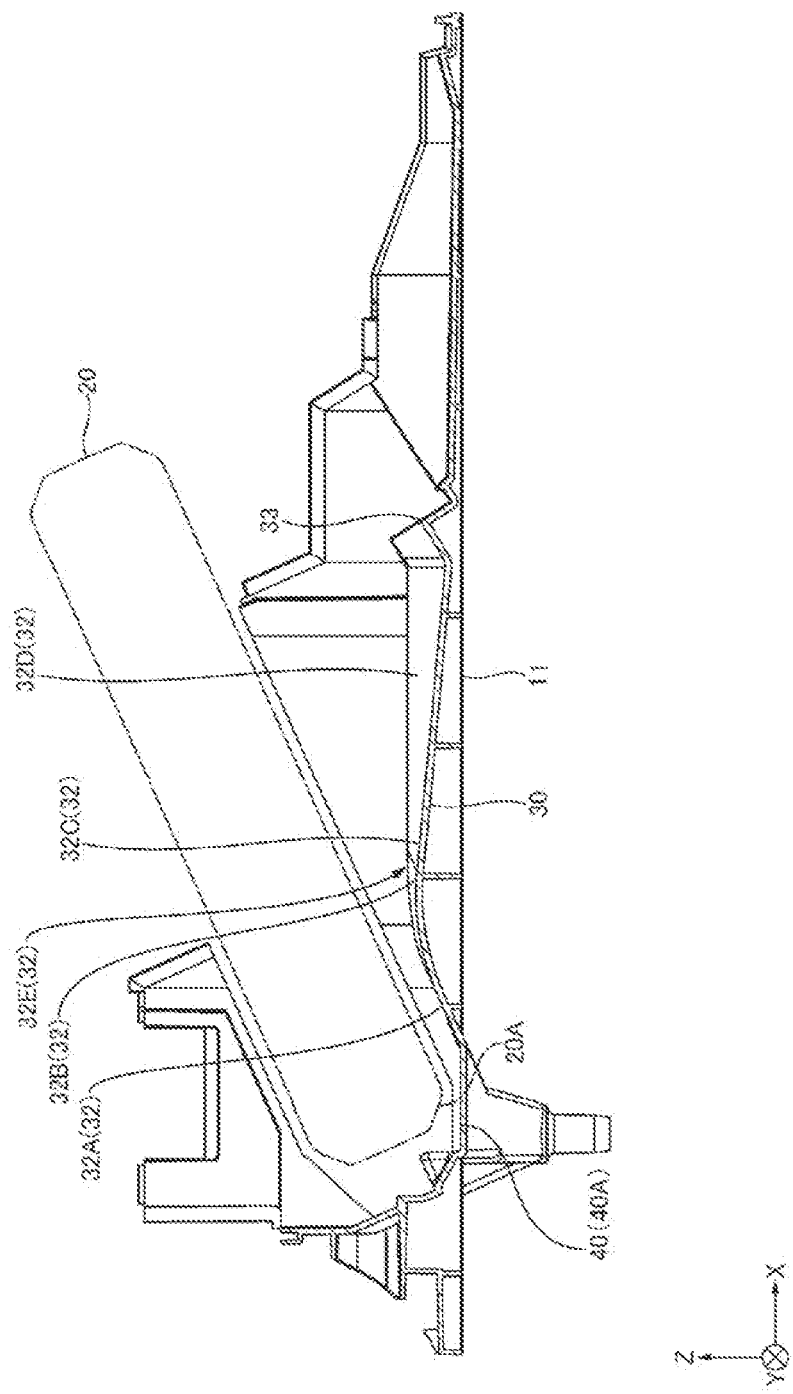
FIG. 6 illustrates the drain pan and the drainage channels of the vehicle air conditioning apparatus (cross-sectional view taken along line X1-X1 of FIG. 5).

As illustrated in FIG. 6, the heat absorbing heat exchanger 20 provided above the drain pan 30 is inclined with respect to the support surface 11 (floor F). Here, the inclined surface 32A facing the lower part 20A of the inclined heat absorbing heat exchanger 20 is the steepest among the inclined surfaces 32. The water of condensation flows down mainly to the lower part 20A of the inclined heat absorbing heat exchanger 20, and therefore the bottom of the lower part 20A is located above and near the steep inclined surface 32A to directly face the drainage channel 40 (40A).

According to this vehicle air conditioning apparatus 1, even when the vehicle is inclined to the front, the back, the right or the left at about 30 degrees with respect to the horizontal plane, the inclination of the heat absorbing heat exchanger 20 provided in the air conditioning unit 10 becomes gentle with respect to the horizontal plane, and therefore the water of condensation cannot be dropped through a specific flow path, the drain pan 30 can receive the water anywhere on the inclined surface 32 and guide the water to the drain outlets 41 via the drainage channels 40. The inclination angles of the inclined surfaces 32 are appropriately set to allow the water not to stay but to flow to the drainage channels 40 even when the water drops anywhere on the inclined surface 32, on the assumption of the inclination to the front, the back, the right, and the left.

The top portion 31 is offset from the center of the drain pan 30, and the inclined surface 32 includes the inclined surfaces 32A to 32E formed around the top portion 31 and having inclination angles different from each other. By this means, it is possible to allow the water to effectively flow to the drainage channels 40 by not so elevating the top portion 31. By this means, it is possible to secure a large air flow passage in the air conditioning unit 10 because of a reasonable height of the top portion 31.

In addition, the drainage channels 40 protrude downward from the floor, and therefore it is possible to secure the air flow path in the air conditioning unit 10 in the space on the floor without increasing the air-low resistance, and to increase the inclinations of the flow paths of the drainage channels 40 by utilizing the space under the floor. By this means, it is possible to solve the problem of securing the drainage when the vehicle is inclined, while maintaining the good air conditioning performance of the vehicle air conditioning apparatus 1 provided in a narrow space on the floor. Moreover, the number of drain outlets 41 is not greater than the conventional technology, but an idea of drain paths is introduced. Therefore, it is possible to achieve the drainage when the vehicle is inclined without worsening the product cost.

As described above, the embodiments of the present invention have been described in detail with reference to the drawings. However, the specific configuration is not limited to these embodiments, and the design can be changed without departing from the scope of the present invention. In addition, the above-described embodiments can be combined by utilizing each other's technology as long as there is no particular contradiction or problem in the purpose and configuration.

REFERENCE SIGNS LIST

1: vehicle air conditioning apparatus,
10: air conditioning unit,
10A: blower storage,
10B: heat absorbing heat exchanger storage,
10C: heat releasing heat exchanger storage
10D: blowing path forming section,
10P: inlet, 10Q: outlet, 11: support surface
20: heat absorbing heat exchanger, 20A: lower part
30: drain pan, 31: top portion,
32 (32A, 32B, 32C, 32D, 32E): inclined surface,
33: standing wall, 34: cliff portion,
40 (40A, 40B): drainage channel, 41 (41A, 41B): drain outlet,
F: floor, G: diagonal line

The invention claimed is:

1. A vehicle air conditioning apparatus comprising an air conditioning unit including an air flow path along a floor of a vehicle,
   the air conditioning unit including:
   a drain pan provided in a bottom of the air conditioning unit; and
   first and second drainage channels provided around the drain pan, wherein:
   the drain pan includes an inclined surface formed on an inner wall surface of the drain pan and configured to incline downward from a top portion having an upward convex shape to the first and second drainage channels, the top portion being formed locally in a plan view; and
   the first and second drainage channels include first and second drainage flow paths, respectively, configured to allow water to flow to first and second drain outlets, respectively, provided in the first and second drainage channels, respectively, wherein
   the top portion is provided at a position offset from a center of the drain pan, the position being offset to a first and second drainage channels side with respect to a diagonal line connecting between the first and the second drain outlets provided at diagonal positions of the drain pan in the plan view, and
   a heat absorbing heat exchanger is provided in the air flow path of the air conditioning unit, the heat absorbing heat exchanger being inclined with respect to an air flow direction;
   the inclined surface includes a first inclination facing a lower surface of the heat absorbing heat exchanger, and a second inclination that inclines so as to depart from the heat absorbing heat exchanger as the second inclination departs from the top portion.

2. The vehicle air conditioning apparatus according to claim 1, wherein:
   the drainage channels are provided around two sides of an outer edge of the inclined surface, the two sides crossing one another; and
   other sides of the outer edge of the inclined surface are inclined downward to the drainage channels, respectively.

3. The vehicle air conditioning apparatus according to claim 1, wherein:
   the drainage channels protrude downward from the floor.

* * * * *